United States Patent
Ghoshal

(10) Patent No.: US 7,797,558 B2
(45) Date of Patent: Sep. 14, 2010

(54) POWER OVER ETHERNET WITH ISOLATION

(76) Inventor: Sajol Ghoshal, 3343 Kensington Dr., El Dorado Hills, CA (US) 95762

( * ) Notice: Subject to any disclaimer, the term of this patent is extended or adjusted under 35 U.S.C. 154(b) by 773 days.

(21) Appl. No.: 11/562,899

(22) Filed: Nov. 22, 2006

(65) Prior Publication Data
US 2007/0121832 A1    May 31, 2007

Related U.S. Application Data

(63) Continuation-in-part of application No. 11/207,595, filed on Aug. 19, 2005, now abandoned, and a continuation-in-part of application No. 11/207,602, filed on Aug. 19, 2005, now Pat. No. 7,469,348.

(51) Int. Cl.
*G06F 1/26* (2006.01)
(52) U.S. Cl. ..................................... 713/310
(58) Field of Classification Search .................. 713/310
See application file for complete search history.

(56) References Cited

U.S. PATENT DOCUMENTS

| | | | | |
|---|---|---|---|---|
| 5,444,600 | A * | 8/1995 | Dobkin et al. | 361/303 |
| 5,446,735 | A * | 8/1995 | Tobagi et al. | 370/445 |
| 6,483,203 | B1 * | 11/2002 | McCormack | 307/17 |
| 7,330,544 | B2 * | 2/2008 | D'Angelo et al. | 379/399.01 |
| 7,504,748 | B2 * | 3/2009 | Chang et al. | 307/126 |
| 7,511,515 | B2 * | 3/2009 | Herbold | 324/691 |
| 2004/0090984 | A1 * | 5/2004 | Saint-Hilaire et al. | 370/463 |
| 2004/0091030 | A1 * | 5/2004 | Rakib et al. | 375/222 |

\* cited by examiner

*Primary Examiner*—Thomas Lee
*Assistant Examiner*—Eric Chang

(57) ABSTRACT

A powered device on a network is isolated by communicating operating power and data to a powered device from a network line, referencing the network line to a line reference, and referencing the powered device to a device reference that can be different from the line reference. The powered device is isolated from the network line with an isolation boundary positioned between distributed power and the powered device at a digital port coupled to the powered device.

34 Claims, 15 Drawing Sheets

POWER OVER ETHERNET WITH ISOLATION

CROSS REFERENCE TO RELATED APPLICATIONS

This application claims the benefit of priority to as a continuation-in-part and incorporates herein by reference in its entirety for all purposes, U.S. patent application Ser. No. 11/207,595 entitled "METHOD FOR HIGH VOLTAGE POWER FEED ON DIFFERENTIAL CABLE PAIRS," by John R. Camagna, et al. filed Aug. 19, 2005; and Ser. No. 11/207,602 entitled "A METHOD FOR DYNAMIC INSERTION LOSS CONTROL FOR 10/100/1000 MHZ ETHERNET SIGNALLING," by John R. Camagna, et al., which have been filed concurrently filed Aug. 19, 2005.

BACKGROUND

Many networks such as local and wide area networks (LAN/WAN) structures are used to carry and distribute data communication signals between devices. Various network elements include hubs, switches, routers, and bridges, peripheral devices, such as, but not limited to, printers, data servers, desktop personal computers (PCs), portable PCs and personal data assistants (PDAs) equipped with network interface cards. Devices that connect to the network structure use power to enable operation. Power of the devices may be supplied by either an internal or an external power supply such as batteries or an AC power via a connection to an electrical outlet.

Some network solutions can distribute power over the network in combination with data communications. Power distribution over a network consolidates power and data communications over a single network connection to reduce installation costs, ensures power to network elements in the event of a traditional power failure, and enables reduction in the number of power cables, AC to DC adapters, and/or AC power supplies which may create fire and physical hazards. Additionally, power distributed over a network such as an Ethernet network may function as an uninterruptible power supply (UPS) to components or devices that normally would be powered using a dedicated UPS.

Additionally, network appliances, for example voice-over-Internet-Protocol (VoIP) telephones and other devices, are increasingly deployed and consume power. When compared to traditional counterparts, network appliances use an additional power feed. One drawback of VoIP telephony is that in the event of a power failure the ability to contact emergency services via an independently powered telephone is removed. The ability to distribute power to network appliances or circuits enable network appliances such as a VoIP telephone to operate in a fashion similar to ordinary analog telephone networks currently in use.

Distribution of power over Ethernet (PoE) network connections is in part governed by the Institute of Electrical and Electronics Engineers (IEEE) Standard 802.3 and other relevant standards, standards that are incorporated herein by reference. However, power distribution schemes within a network environment typically employ cumbersome, real estate intensive, magnetic transformers. Additionally, power-over-Ethernet (PoE) specifications under the IEEE 802.3 standard are stringent and often limit allowable power.

IEEE 802.3 for PoE systems specifies standards for electromagnetic interference (EMI) immunity and emissions. EMI emissions can be caused by inductive coupling of external common mode sources coupling to the twisted pair cable or power supply wall adaptor. In addition a powered device (PD) can generate electromagnetic emissions through common mode noise and transmit the noise on the twisted pair cable or power supply cable, thus radiating emissions outside an enclosure for the powered device, violating FCC radiation specifications FCC/CISPRR Class B.

IEEE 802.3 for PoE systems specifies standards for immunity to overvoltage and surge events which can be caused by inductive coupling of external lightning events or simply by static electricity buildup on Ethernet cabling. The discharge of overvoltage or surge energy into sub-micron semiconductor devices can easily become destructive. In conventional PoE systems, expensive and ruggedized external components such as sidactors are typically added to shield silicon-based devices from the stresses of external surge events by clamping the surge voltage and forming a large current path for the surge to ground, a surge path that can ruin performance of sensitive circuits unless routed around the circuits. Accordingly, protective components are dependant on board parasitic and layouts which can vary, creating difficulty in ensuring consistent performance. In addition, the components are typically high capacitance and tend to degrade overall system performance in high speed communication links.

SUMMARY

According to an embodiment of a network system, a powered device on a network is isolated by communicating operating power and data to a powered device from a network line, referencing the network line to a line reference, and referencing the powered device to a device reference that can be different from the line reference. The powered device is isolated from the network line with an isolation boundary positioned between distributed power and the powered device at a digital port coupled to the powered device.

BRIEF DESCRIPTION OF THE DRAWINGS

Embodiments of the invention relating to both structure and method of operation may best be understood by referring to the following description and accompanying drawings.

DETAILED DESCRIPTION

Figure 3A:
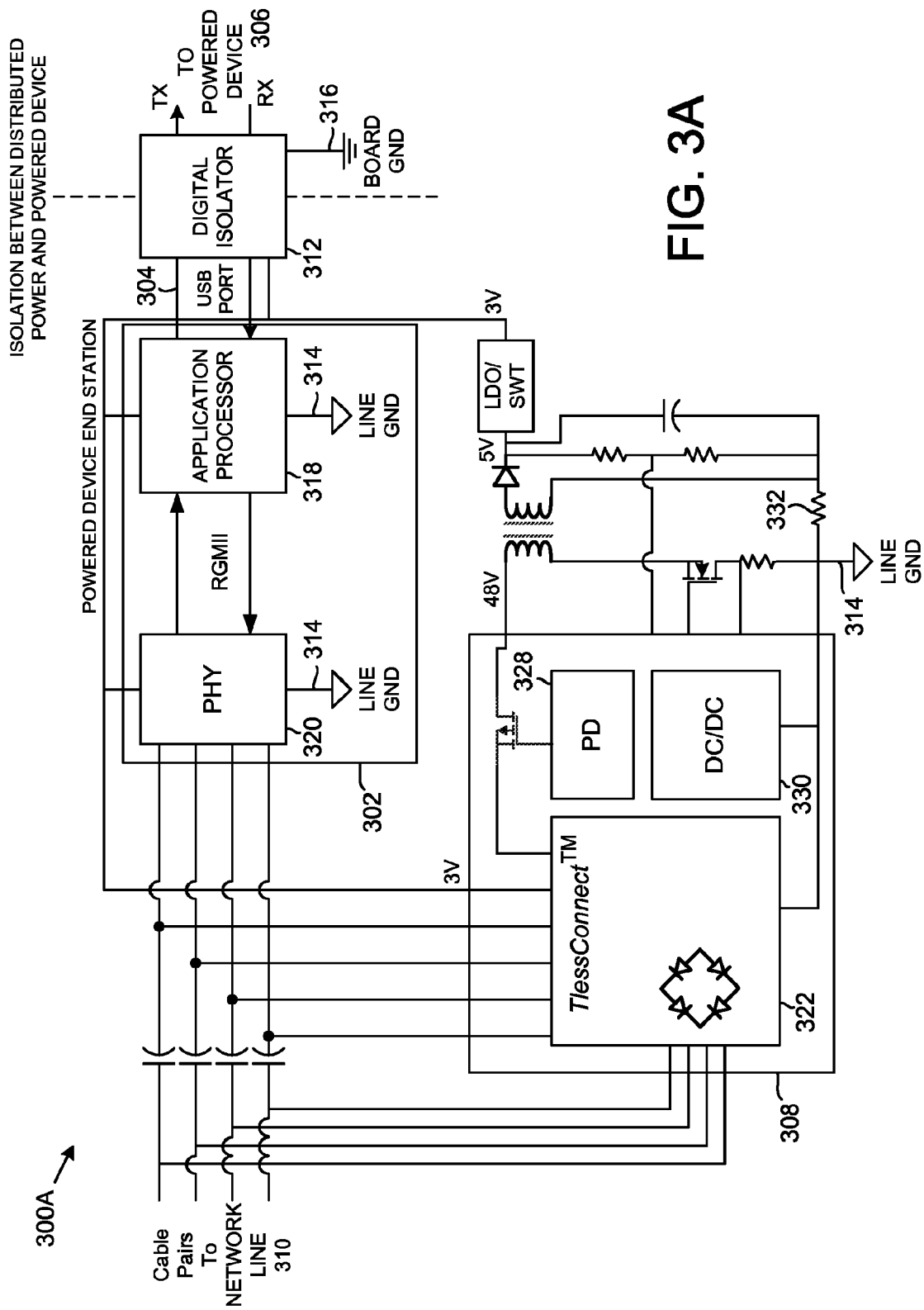
FIGS. 3A, 3C, 3D, and 3E are schematic block diagrams respectively illustrating embodiments of circuits adapted for connectivity to a network that include isolation of multiple ground domains.

Referring to FIG. 3A, a schematic block diagram illustrates an embodiment of a circuit 300A adapted for connectivity to a network. The circuit 300A comprises an application device 302 with a port 304 for interfacing to a powered device 306 and an interface 308 configured for coupling a network line 310 to the powered device 306 via the application device 302 and communicating operating power and data to the powered device 306 from the network line 310. The circuit 300A further comprises an isolator 312 coupled between the application device 302 and the powered device 306 that isolates the application device 302 and the interface 308 which are referenced to a line reference 314 from the powered device 306 that is referenced to a device reference 316.

In an illustrative embodiment, the application device 302 and the interface 308 can be configured in compliance to an Institute of Electrical and Electronics Engineers (IEEE) 802.3 Power over Ethernet (PoE) standard for PoE applications. The interface 308 can connect directly to the line and forms a seamless interface to IEEE 802.3 compliant 10/100/1000 PHY.

In a particular example embodiment, the interface 308 can be implemented as a single-chip, highly integrated complementary metal-oxide-semiconductor (CMOS) solution for Power-over-Ethernet (PoE) applications such as Voice over IP (VoIP) Phones, Wireless LAN Access Point, Security and Web Cameras, Analog Telephone Adapters (ATA), Point-of-Sale (PoS) Terminals, and many other applications. The interface 308 can be implemented to minimize the number of components, thereby improving reliability. The interface 308 can be configured in compliance with standards for electromagnetic interference (EMI) emissions, EMI immunity, and system capabilities for surge protection, power transmission and return loss specifications without the use of an external Ethernet networking transformer.

Other embodiments may be either multiple-chip or single-chip configurations, combinations of multiple discrete components and/or one or more integrated circuit chips, or the like. Similarly, other embodiments may include integrated circuits constructed using any suitable technology other than CMOS technology. Various embodiments may also be implemented in applications other than PoE standard applications and may be used for other functionality than the listed functions.

The port 304 can be a digital port. For example, in particular implementations the port can comprise a Universal Serial Bus (USB) port, a RETMA Standard (RS)-232 port, Inter-Integrated Circuit (I²C), Management Data Input/Output (MDIO), or any other suitable bus.

As depicted, the application device 302 can comprise an application processor 318 and an Ethernet Physical layer (PHY) 320 which is coupled between the network line 310 and the application processor 318. Although the interface can be a transformer interface, in the illustrative embodiment, the interface 308 can comprise a T-lessConnect™ solid-state transformer line interface 322 that connects the Ethernet PHY 320 to the network line 310 and transfers operating power and data to the powered device 306 in absence of networking line transformers.

In the illustrative embodiment, the interface 308 incorporates the T-lessConnect™ line interface (Transformerless) 322 made available by Akros Silicon, Inc. of Sacramento, Calif., that connects PHY 320 directly to a twisted pair cable. The T-lessConnect™ solid-state transformer platform 322 feeds power, for example at a 48 volt supply, and data such as at a rate of 10/100/1000 megabits per second (Mbps) directly into integrated circuits without using networking line transformers. The interface 308 can couple to Ethernet physical layer transceivers and performs powered device (PD) power management functionality according to the IEEE Standard 802.3af-2003.

In conventional PoE systems, EMI noise can be primarily generated from switching of DC/DC converter elements or the common mode noise arising from an imbalance in the PHY transmit or receive differential signals. To achieve good EMI immunity, low common mode impedance is desirable especially at high frequencies. In the convention PoE system, EMI immunity is typically addressed by manual tweaking of a circuit board to limit EMI radiation, a technique which can detrimentally affect the performance of other sensitive circuits and signals on the board. The illustrative interface 308 can be an integrated circuit that reduces EMI while maintaining consistent performance without the manual tweaking of conventional systems, thereby attaining consistent performance with minimal effort.

Figure 3B:
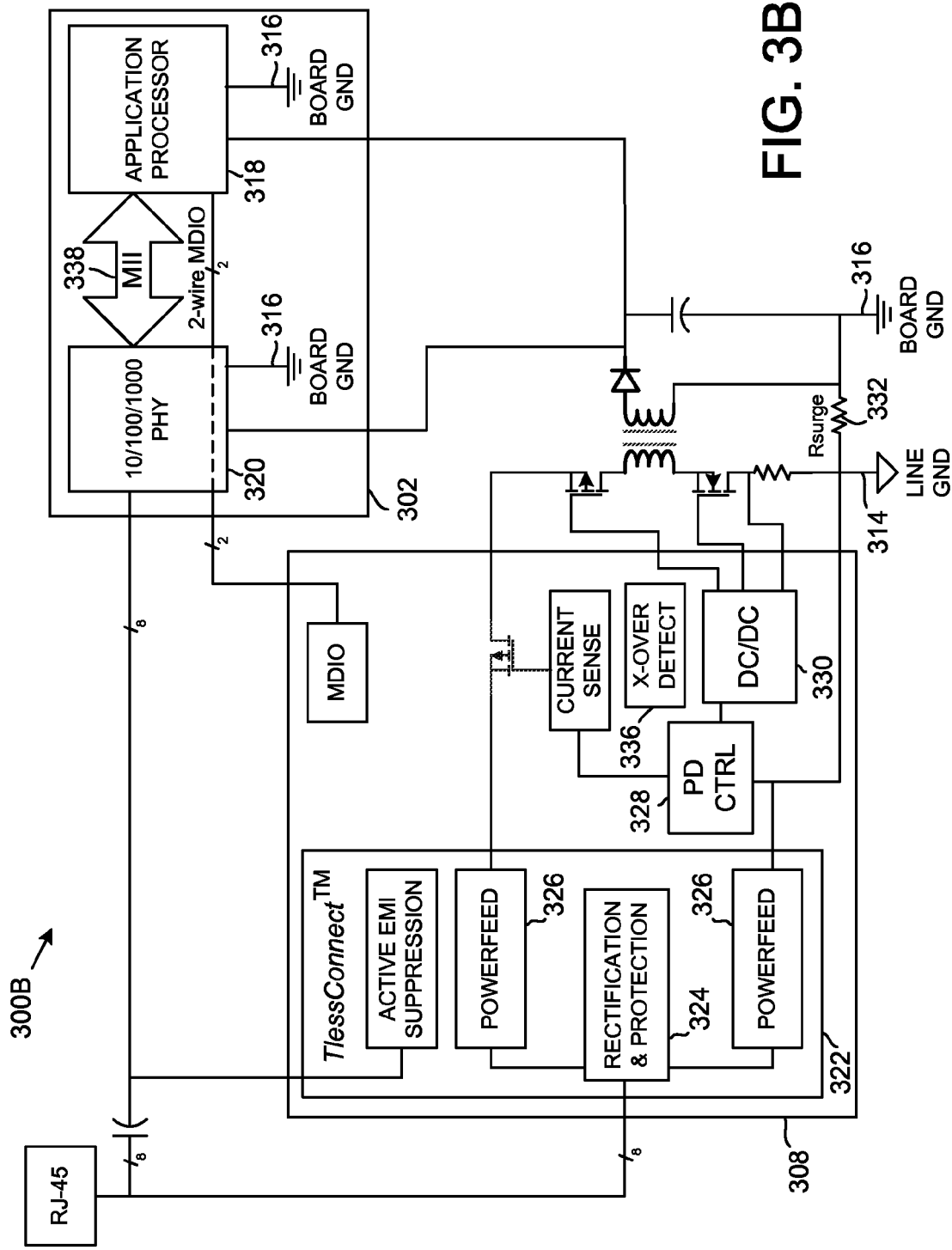
FIG. 3B is a schematic block diagram showing a connectivity circuit without isolation.

Referring to FIG. 3B, a schematic block diagram shows a connectivity circuit 300B without isolation which is included to simplify explanation of a configuration for EMI immunity and surge protection. The circuit 300B includes the interface 308 in combination with Ethernet PHY 320 and a DC/DC converter 330 in a non-isolated arrangement. Circuits that implement isolation can include similar structures for EMI immunity and surge protection. In an illustrative embodiment, the circuit 300 can facilitate immunity to overvoltage and surge events by including integrated diodes and protection circuitry in the interface 308, enabling a much faster response to the surge event. Protection circuitry in the T-lessConnect™ interface 322 can be configured to absorb most of the charge while developing a small voltage across the PHY terminals and ensuring that bridge diodes are not subjected to large voltage excursions that exceed the diode ratings. In typically Power-over-Ethernet operations are sourced from a typical 48 volt supply, the voltage excursions are added to the 48 volt supply, creating challenge in operating below the diode reverse bias voltage rating.

In the illustrative interface 308, the line reference 314 is the power reference from the line for example via an RJ45 connector and is transferred through the DC/DC converter 330 to the device reference 316, specifically shown in the example as the ground reference of the PHY/processor combination. Transfer of the line reference 314 to the PHY/processor enables the entire circuit 300 to be referenced to a common low ground, substantially improving surge protection and reducing EMI radiations due to ground loops.

The surge resistance (Rsurge) 332 is coupled to the interface 308 and enables the interface 308 to control the connection of line reference 314 (Line_GND) and the device reference 316 (Board_GND). In an example embodiment, under normal operations Rsurge is very low impedance, for instance approximately 1.5 ohms, and creates a low impedance ground return path for EMI noise, thus substantially reducing emissions and enabling a high level of immunity. EMI noise generated from switching of the DC/DC converter elements or the common mode noise arising from an imbalance in the PHY transmit or receive differential signals is shunted to line ground 314 through the low impedance Rsurge resistor 332 thus reducing the voltage of any radiated noise on the twisted pair cable. In addition the low Rsurge impedance forms a low impedance path to external common mode disturbers, thus giving high common mode immunity for the device or PHY/processor circuit board.

During a surge/lightning event, the crossover detect circuits 336 in the interface 308 respond by making Rsurge 332 relatively larger, for example an open circuit, thus increasing the impedance from the device reference 316 (Board_GND) to the line reference 314 (Line_GND). If Rsurge impedance is high during a surge event, all the surge energy is forced to flow through the T-lessConnect™ interface 322 which is configured to absorb surge strikes of 8 kV contact discharge or 15 kV air discharge. The crossover circuit 336 in the interface 308 is configured to respond to fast transients that exceed 70V. In an illustrative embodiment, the interface 308 can be constructed using a 100 volt CMOS process that enables very robust handling of high currents associated with the surges, for example currents in the range of 25 amperes. The interface 308 thus protects the PHY 320 and any down stream circuits from potentially hazardous overvoltage strikes.

A surge resistor 332 can be coupled between the interface 308 and the application device 302 and forms a low impedance ground return path for electromagnetic interference (EMI) noise under normal operation. The solid-state transformer line interface 322 can further comprise a cross-over detect circuit 336 that responds to surge/lightning events by increasing the surge resistance 332 to an open circuit, thereby increasing impedance from the device reference 316 to the line reference 314.

The circuit 300A shown in FIG. 3A extends functionality beyond capabilities of the circuit 300B in FIG. 3B by addition of isolation of ground domains. The interface 308 performs the functions enabling Power-over-Ethernet (PoE) powered device (PD) applications. For configurations in which Universal Serial Bus (USB)/RS232 connections are used and are referenced to an isolated board ground (device reference 316) which is isolated from line ground (line reference 314), a digital isolator 312 can be added. The isolator 312 electrically isolates the different ground domains without usage of an opto-isolator needed in the DC/DC converter feedback loop. The isolator 312 thus enables isolation for those applications that demand isolation between the line and configuration ports 304 such as USB or RS-232 ports.

Figure 7A:
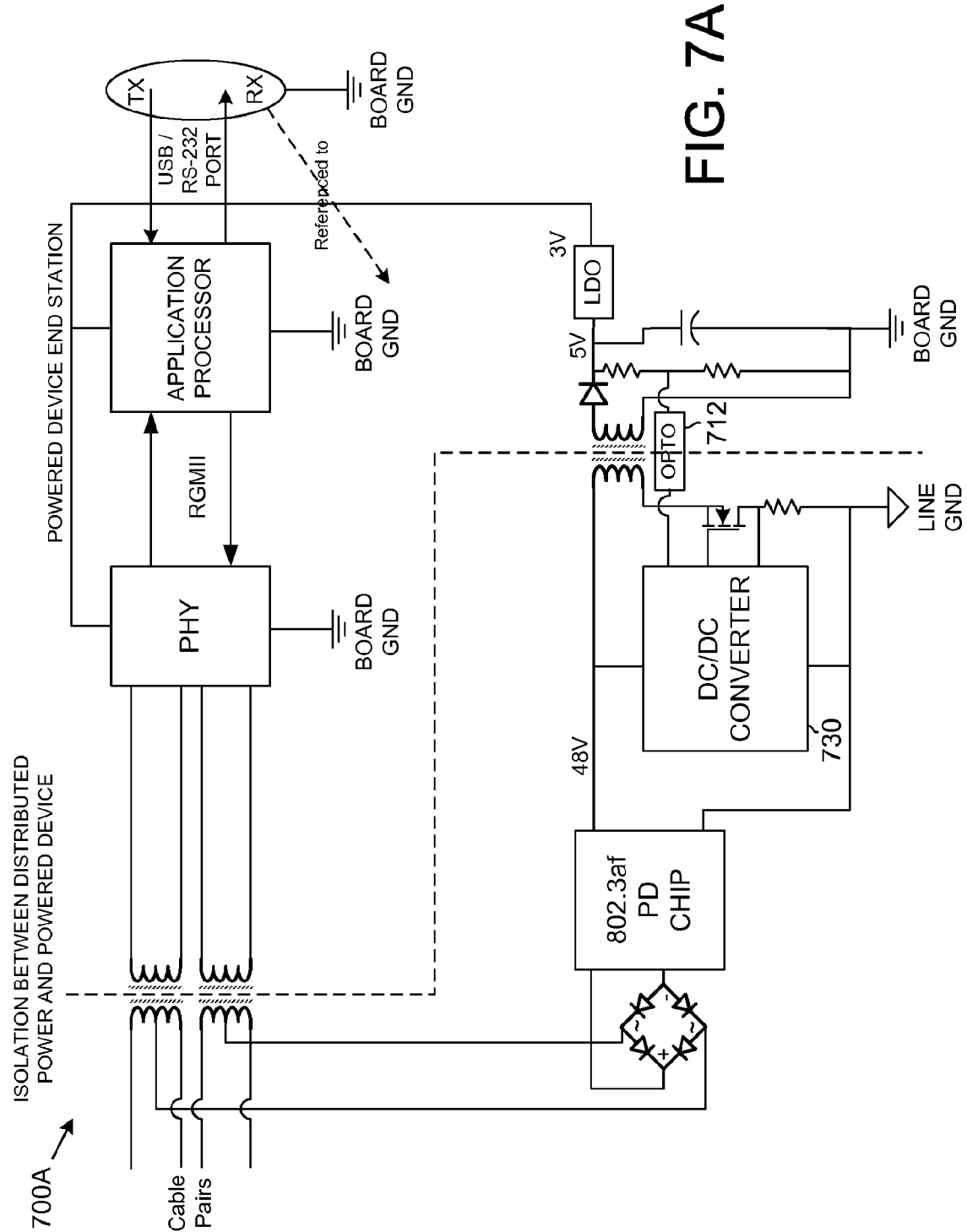
FIGS. 7A and 7B are schematic block and circuit diagrams illustrating embodiments of transformer-based Power-over-Ethernet circuits that supply power to a network device in an isolated arrangement.

The circuit 300A illustrated in FIG. 3A is a Power-over-Ethernet (PoE) implementation with isolation to USB or RS-232 ports 304 which can be compared to a transformer-based PoE implementation with isolation to USB/RS-232 ports shown in FIG. 7A.

As shown by comparison of FIG. 7A to FIG. 3A, the digital isolator 312 replaces an opto-coupler 712 which can be used in DC/DC converters 730 in the transformer-based circuit 700A. The circuit 300A can be implemented using high volume cost effective CMOS technology. The circuit 300A moves the isolation boundary from inside a powered device (PD) circuit board to the location where the isolation is most appropriate, for example at relatively low speed digital ports 304 such as RS-232 or USB ports. The circuit 300A attains the robust performance in protecting the sensitive board integrated circuits from surge energy and controls EMI while enabling isolation to occur without compromising the system design specifications for high performance surge protection and EMI rejection.

Figure 3C:
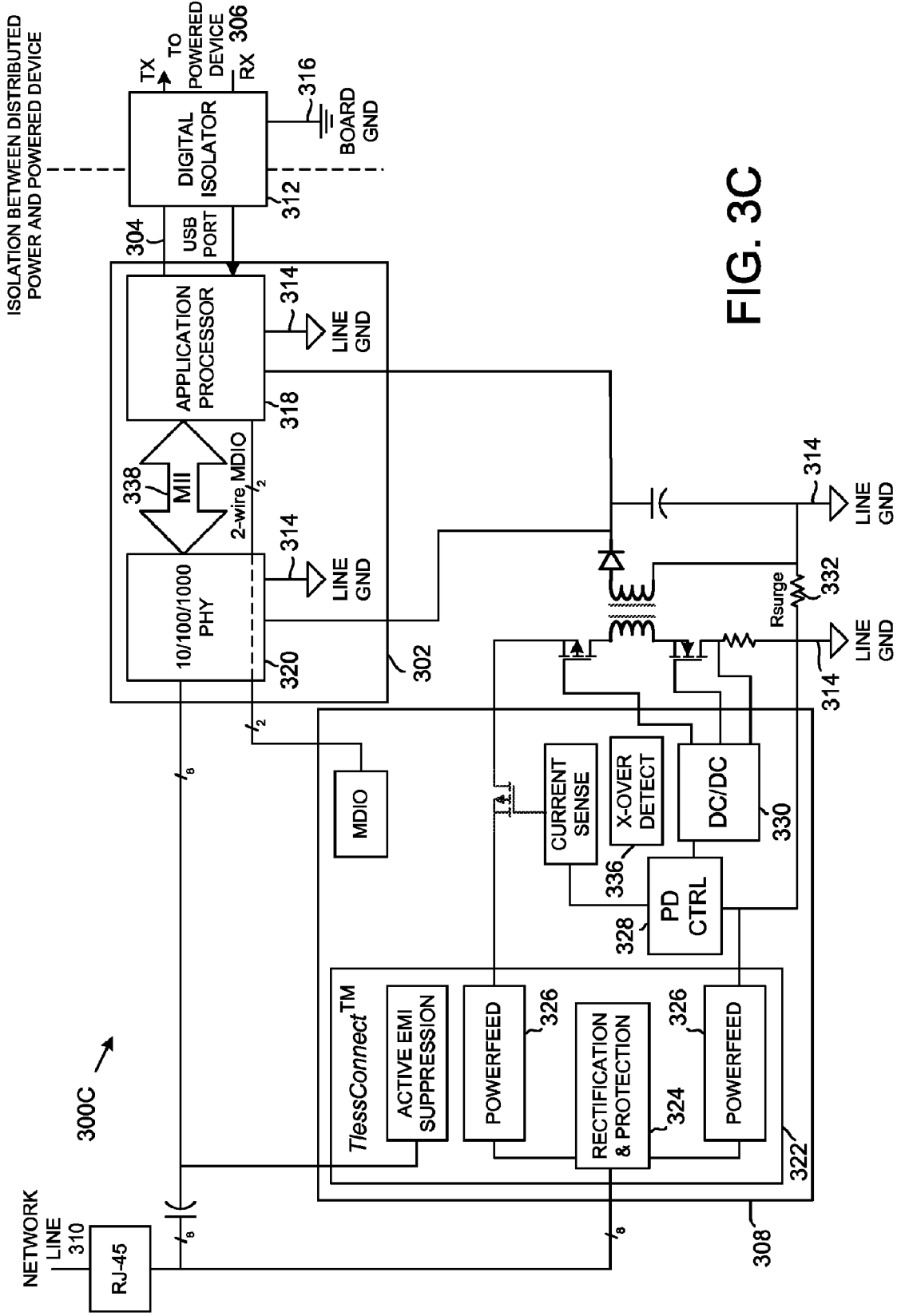

Referring to FIG. 3C, a schematic block diagram shows an embodiment of a circuit 300C that supports isolation of multiple ground domains. The illustrative interface 308 can be implemented in an integrated circuit configuration for EMI and surge protection, and isolation. The circuit 300C includes an Ethernet Physical layer (PHY) 320 and a DC/DC controller 330 with isolation supplied by a digital isolator 312. The digital isolator 312 can be included in a modular design of the circuit 300A that can be used for isolated applications and can be implemented as a board stuffing option, thus enabling additional flexibility to a system designer. The application device 302 comprises the application processor 318 and the Ethernet Physical layer (PHY) 320 coupled between the network line 310 and the application processor 318. A Media Independent Interface (MII) 338 couples the Ethernet PHY 320 to the application processor 318 which can be operative as a Media Access Controller (MAC) device.

Illustratively, the T-lessConnect™ solid-state transformer line interface 322 can be a solid-state transformer line interface that comprises a rectification and electromagnetic interference (EMI) protection circuit 324 coupled to the network line 310, first and second power feed elements 326 coupled to the rectification and EMI protection circuit 324, a powered device (PD) controller 328 coupled between the first and second power feed elements 326, and a direct current-to-direct current (DC/DC) converter 330. The solid-state transformer line interface 322 transfers the line reference 314 through the DC/DC converter 330 to a ground reference of the application device 302 through a surge resistance 332, referencing the application device 302 and the solid-state transformer line interface 322 to a common ground.

Figure 3D:
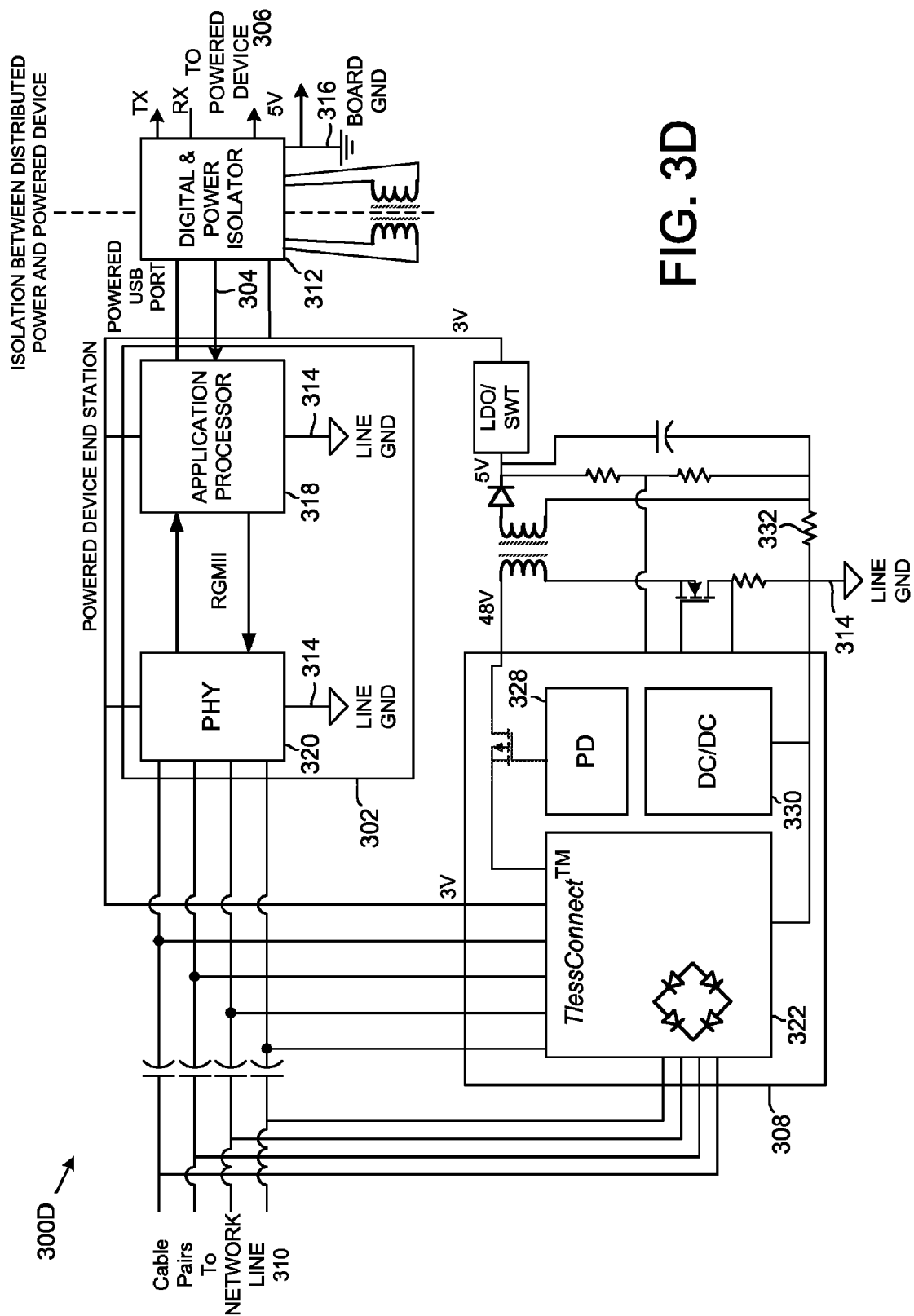

Referring to FIG. 3D, a schematic block diagram shows an embodiment of circuit 300D that implements isolation for powered Universal Serial Bus (USB) applications. The circuit 300D illustrated in FIG. 3D is a Power-over-Ethernet (PoE) implementation with isolation to a USB port 304 which can be compared to a transformer-based PoE implementation with isolation to powered USB ports shown in FIG. 7B.

The interface 308 performs the functions used for Power-over-Ethernet PD applications in arrangements including powered USB connections which are referenced to an isolated board ground 316 which is isolated from line ground 314. A digital signal and power isolator 312 facilitates isolation and avoids usage of an opto-isolator in the DC/DC converter feedback loop. The digital signal and power isolator 312 thus enables ground domain isolation for applications that demand isolation between the line and configuration ports 304 such as a USB port and supplies isolated power to the USB port, for example up to 2.5 watts on a 5 volt supply.

Figure 7B:
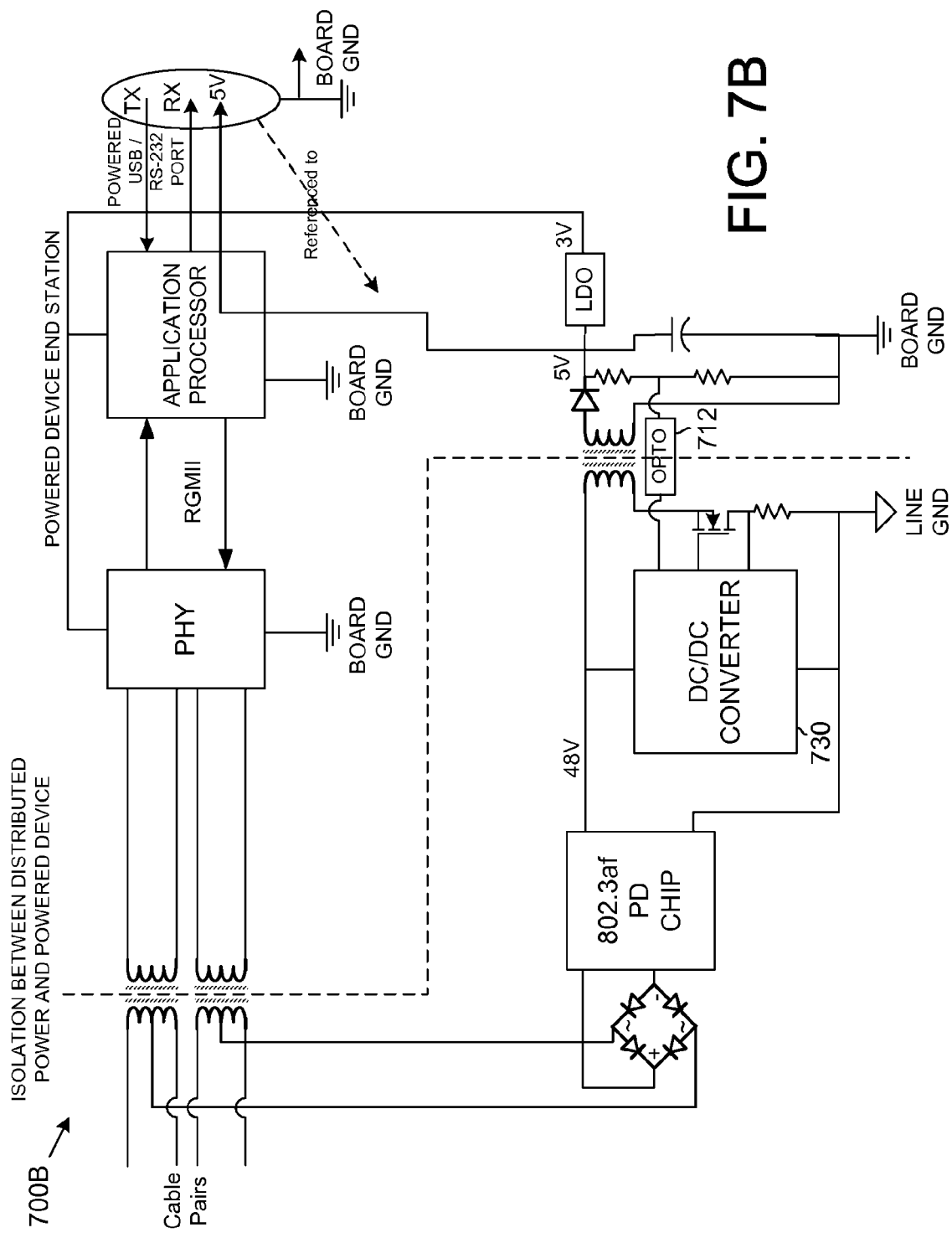

As shown by comparison of FIG. 7B to FIG. 3D, the digital signal and power isolator 312 replaces an opto-coupler 712 which can be used in DC/DC converters 730 in the transformer-based circuit 700B. The circuit 300D can be implemented using high volume cost effective CMOS technology. Power is isolated without opto-isolators and uses a tiny power transformer designed to power, for example 2.5 watts. The circuit 300D moves the isolation boundary from inside a powered device (PD) circuit board to the location where the isolation is most appropriate. The circuit 300D attains the robust performance in protecting the sensitive board integrated circuits from surge energy and controls EMI while enabling isolation to occur without compromising the system design specifications for high performance surge protection and EMI rejection.

Figure 3E:
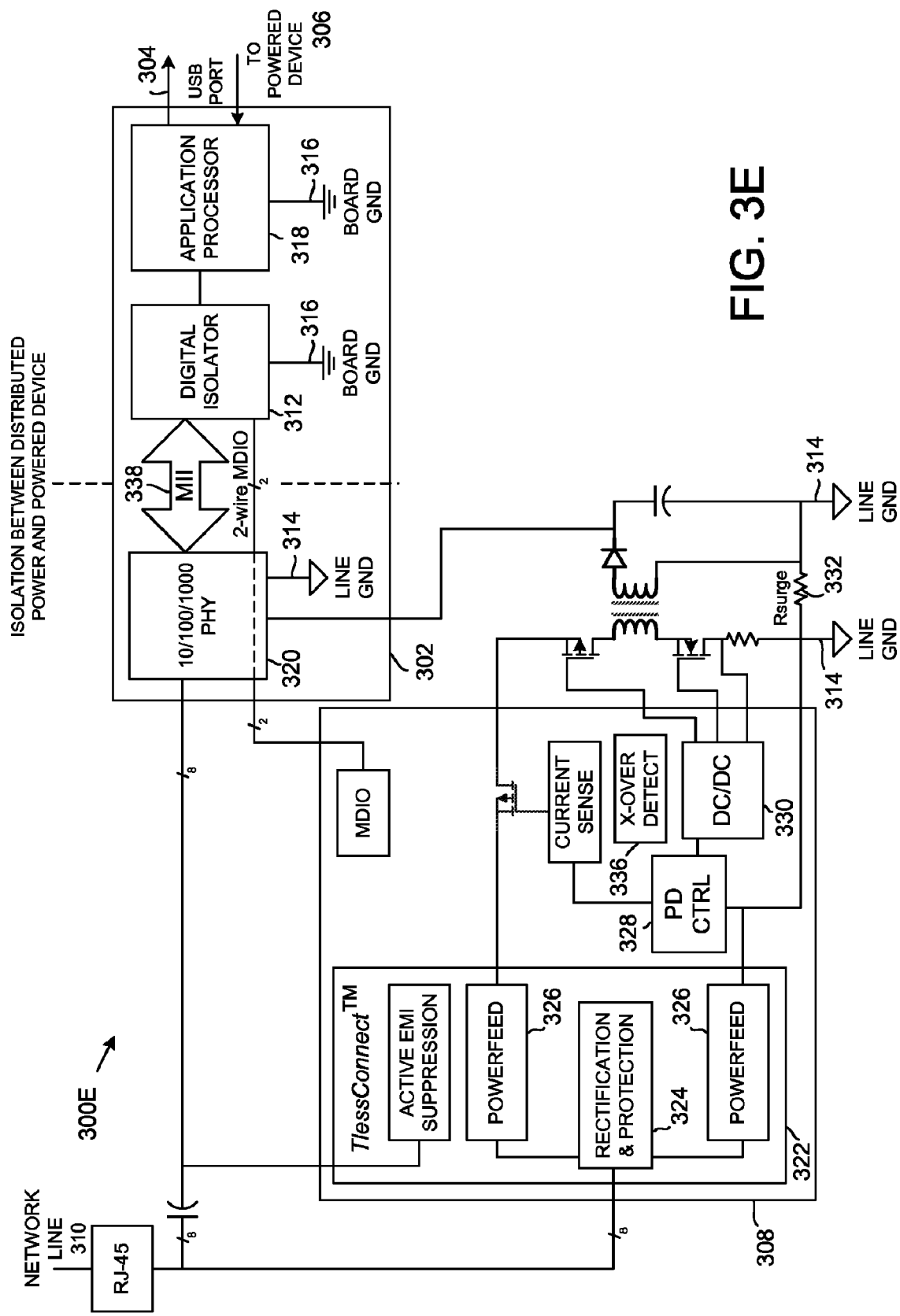

Referring to FIG. 3E, a schematic block diagram illustrates another embodiment of a circuit 300 wherein the application device 302 comprises an Ethernet Physical layer (PHY) 320.

The illustrative interface 308 comprises a T-lessConnect™ solid-state transformer line interface 322 that connects the Ethernet PHY 320 to the network line 310 and transfers operating power and data to the powered device 306 in absence of networking line transformers. In the depicted configuration, a Media Independent Interface (MII) 338 couples the Ethernet PHY 320 to an application processor 318 that is operative as a Media Access Controller (MAC) device in the powered device 306. The MII 338 forms an isolation boundary between distributed power and the powered device 306.

Figure 4A:
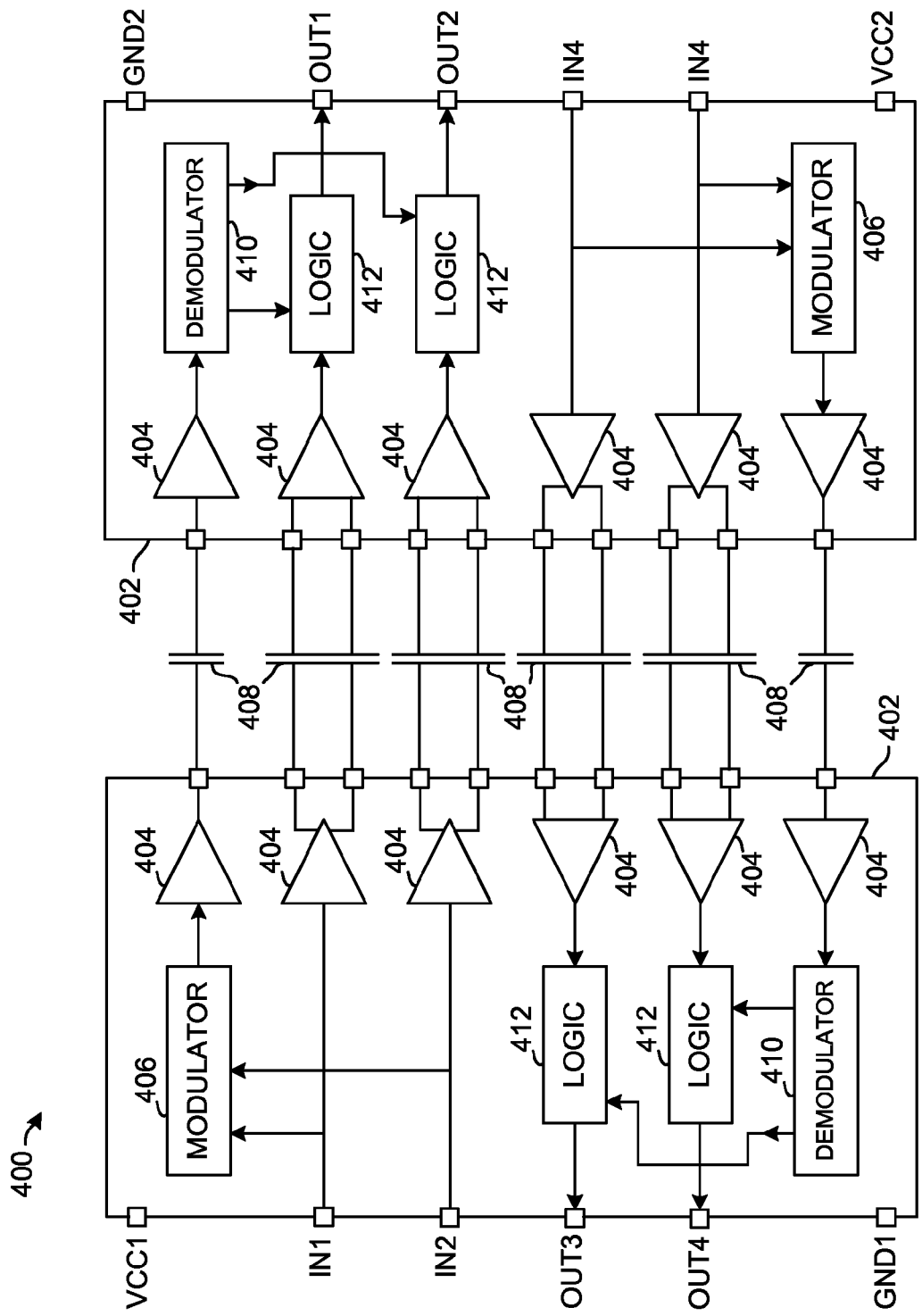
FIGS. 4A and 4B are schematic block diagrams that depict embodiments of isolators that can be used in the connectivity circuits that include isolation of ground domains.

In various embodiments, the isolator 312 can be configured in different forms. For example, referring to FIG. 4A, the isolator 312 can be a digital isolator 400 comprising capacitively-coupled interconnects 402 that capacitively communicate signals bi-directionally between the application device 302 and the powered device 306 whereby optical coupling between the device reference and the line reference can be omitted. Both sides of the interconnects 402 include drivers 404 that can be as simply implemented as one or move inverter stages. Digital signals can be modulated by a modulator 406 for each transmitting portion of the interconnects 402 then transferred across capacitors 408 that differentiate the communicated signal into leading and trailing pulses. Signals are received at drivers 404 in the receiving portion of the interconnects 402 and passed to a demodulator 410 and logic 412 for restoring the signals. In various configurations the receivers can be implemented as either single-ended or differential.

Figure 4B:
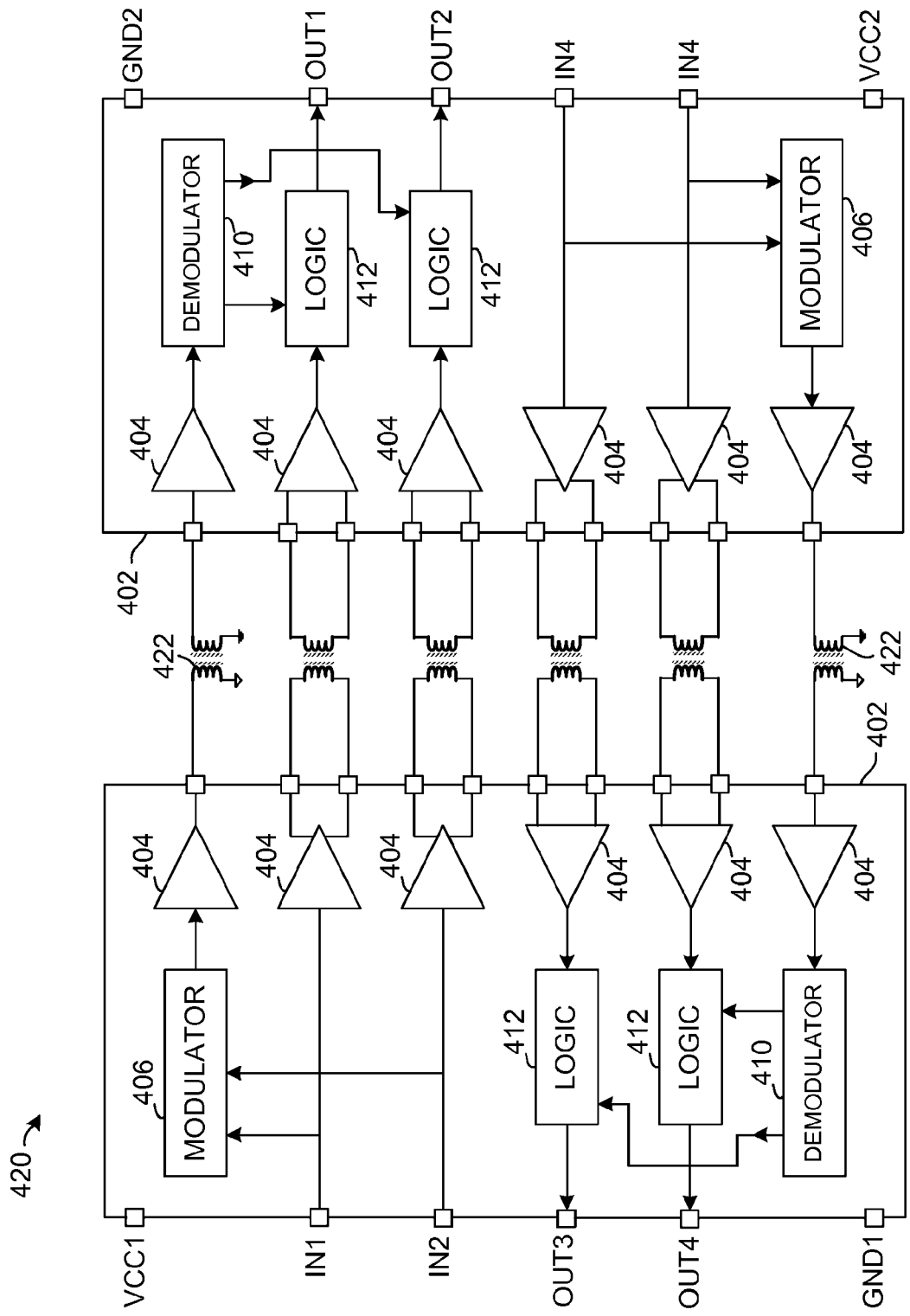

In another example, as shown in FIG. 4B, the isolator 312 can be a digital isolator 420 comprising interconnects 402 that are inductively-coupled 422 and inductively transmit a signal from the application device 302 to the powered device 306 also enabling omission of optical coupling between the device reference 316 and the line reference 314.

In other embodiments, any suitable isolator may be used.

Figure 5:
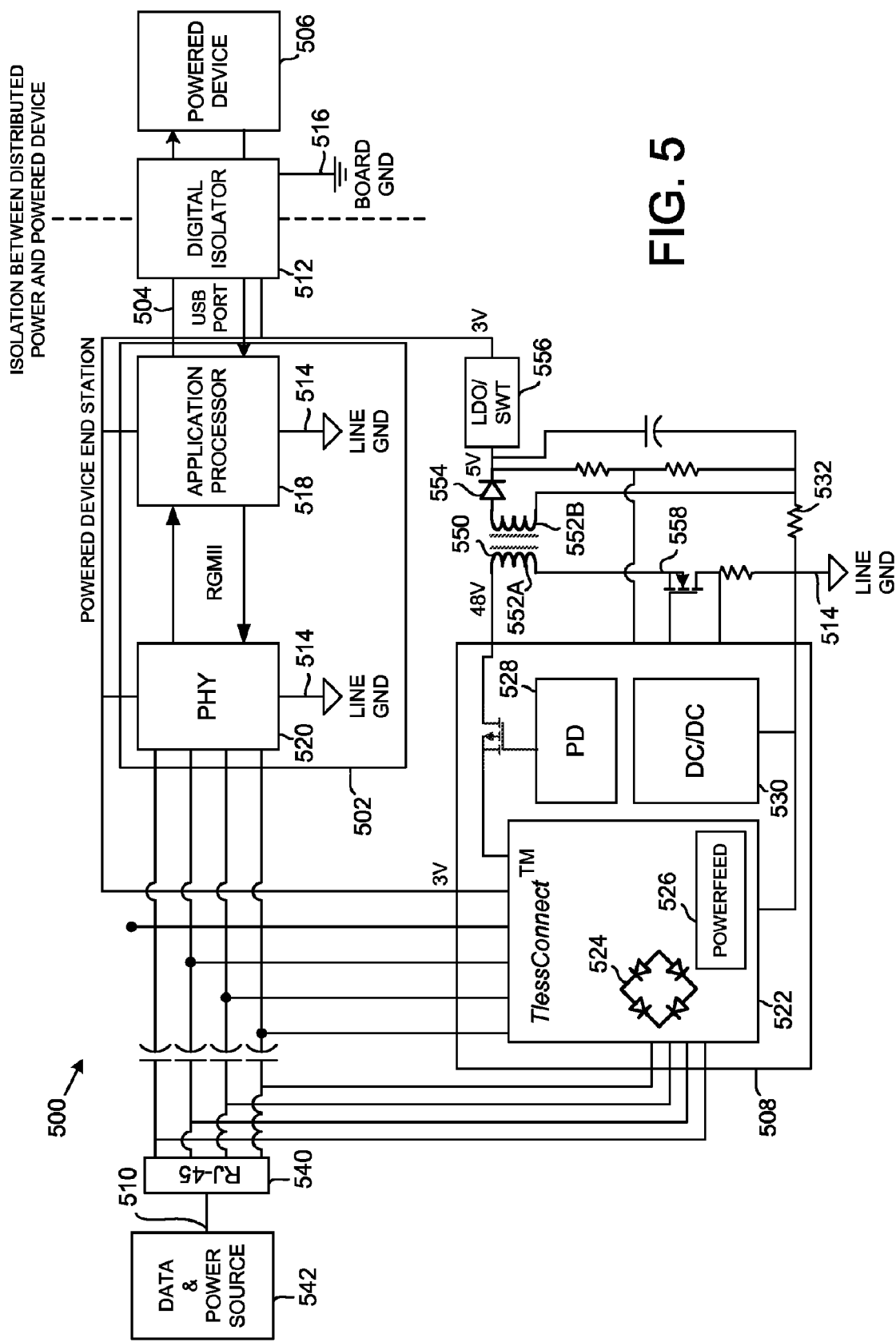
FIG. 5 is a schematic block diagram illustrating an embodiment of a system that connects to and can be powered from a network that includes isolation of ground domains.

Referring to FIG. 5, a schematic block diagram illustrates an embodiment of a system 500 that connects to and can be powered from a network. The system 500 comprises a powered device 506 and a line connector 540 that can be coupled to a network line 510. The system 500 further comprises an application device 502 that includes a port 504 adapted to interface to the powered device 506. An interface 508 is couples the network line 510 via the line connector 540 to the powered device 506 through the application device 502. The interface 508 functions to communicate operating power and data to the powered device 506 from the network line 510. The system 500 further comprises an isolator 512 coupled between the application device 502 and the powered device 506 which functions to isolate components referenced to a line reference 514, including the application device 502 and the interface 508, from components referenced to a device reference 516, for example including the powered device 506.

The system 500 can be adapted to supply power over the network line 510 to the powered device 506. The powered device 506 can be any suitable device such as a Voice-over-Internet-Protocol (VoIP) telephone, an Internet Protocol (IP) telephone, a wireless Local-Area-Network (LAN) Access Point, a security camera, a Web camera (webcam), an Analog Telephone Adapter (ADA), a Point-of-Sale (PoS) terminal, an Ethernet hub, a computer, an appliance, or the like. In some embodiments, the system 500 can be adapted to support an application device 502 and the interface 508 that comply with the Institute of Electrical and Electronics Engineers (IEEE) 802.3 Power over Ethernet standard.

As illustrated, the system 500 can further comprise a power source 542 coupled to the network line 510. The line connector 540 can be a Registered Jack (RJ)-45 connector and the network line 510 configured as two wire pairs coupled to the RJ-45 connector.

The application device 502 can be configured with various components and functionality for coupling via the port 504 to the powered device 506. Suitable components in the application device 502 for usage in the system 500 can include an Ethernet Physical layer (PHY) 520 which is coupled to the network line 510, and the application processor 518 coupled to the PHY 520. The interface 508 can comprise a T-lessConnect™ solid-state transformer line interface 522 for interfacing the Ethernet PHY 520 to the network line 510 and transferring operating power and data to the powered device 506 without using networking line transformers.

The T-lessConnect™ solid-state transformer line interface 522 comprises a rectification and electromagnetic interference (EMI) protection circuit 524 coupled to the network line 510, multiple power feed elements 526 coupled to the rectification and EMI protection circuit 524, a powered device (PD) controller 528 coupled between the power feed elements 526, and a DC/DC converter 530. The T-lessConnect™ solid-state transformer line interface 522 transfers the line reference 514 through the DC/DC converter 530 to a ground reference of the application device 502 through a surge resistance 532, referencing the application device 502 and the solid-state transformer line interface 522 to a common ground.

The system 500 can further comprise a transformer 550 with first and second windings 552A, 552B. The first winding 552A couples to the interface 522 and the second winding 552B couples to the application device 502. A surge resistor 532 couples between the interface 522 and the application device 502 and forms a low impedance ground return path for electromagnetic interference (EMI) noise under normal operation. A diode 554 couples between the transformer second winding 552B and the application device 502. A low dropout regulator 556 can be coupled between the diode 554 and the application device 502. The T-lessConnect™ solid-state transformer line interface 522 can further comprise a cross-over detect circuit 558 that responds to surge/lightning events by increasing the surge resistance 532 to open circuit, thereby increasing impedance from the device reference 516 to the line reference 514.

Figure 6A:
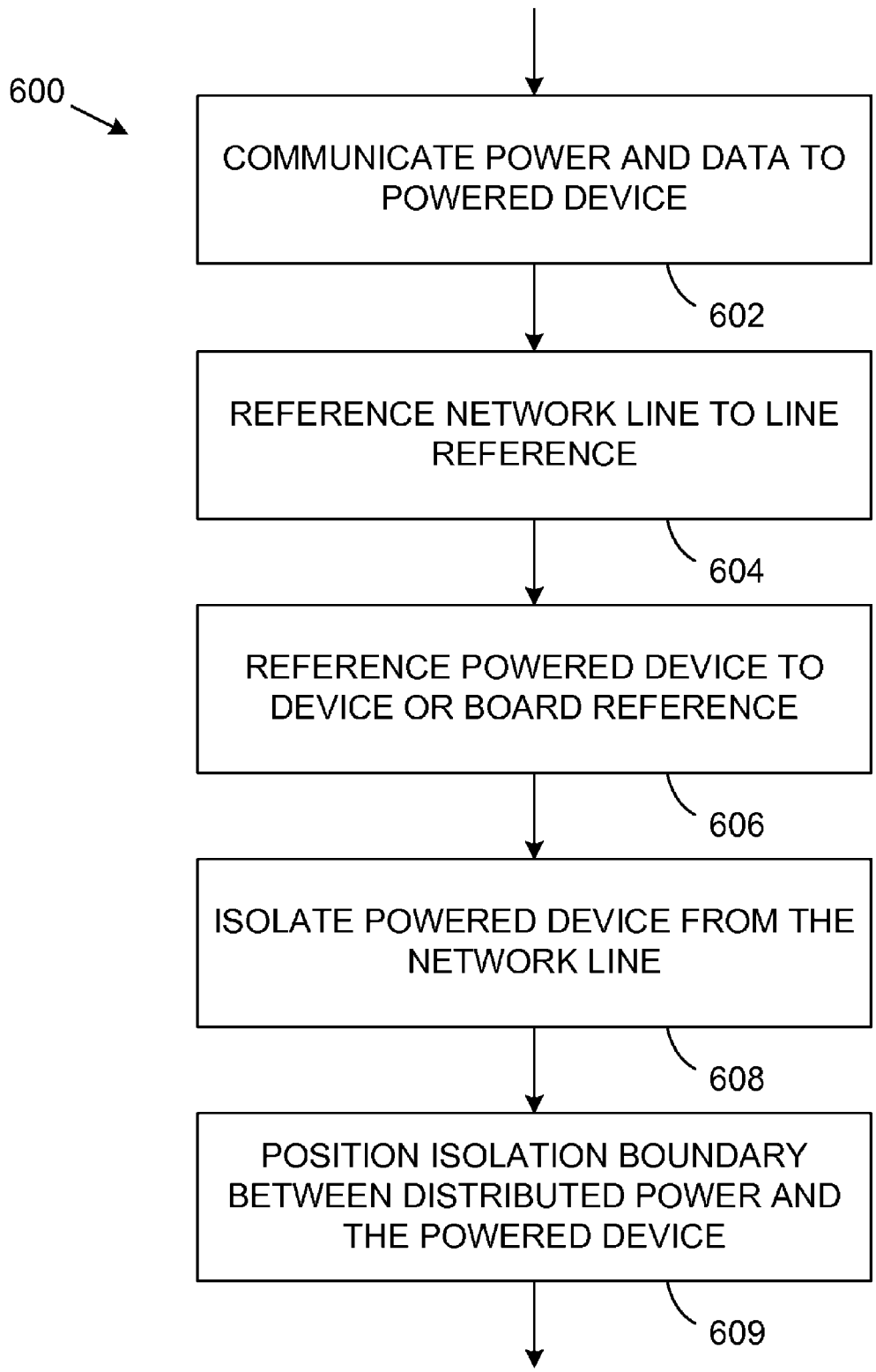
FIGS. 6A and 6B are schematic flow diagrams depicting a method for isolating a powered device in a network configuration that forms multiple ground domains.
Figure 6B:
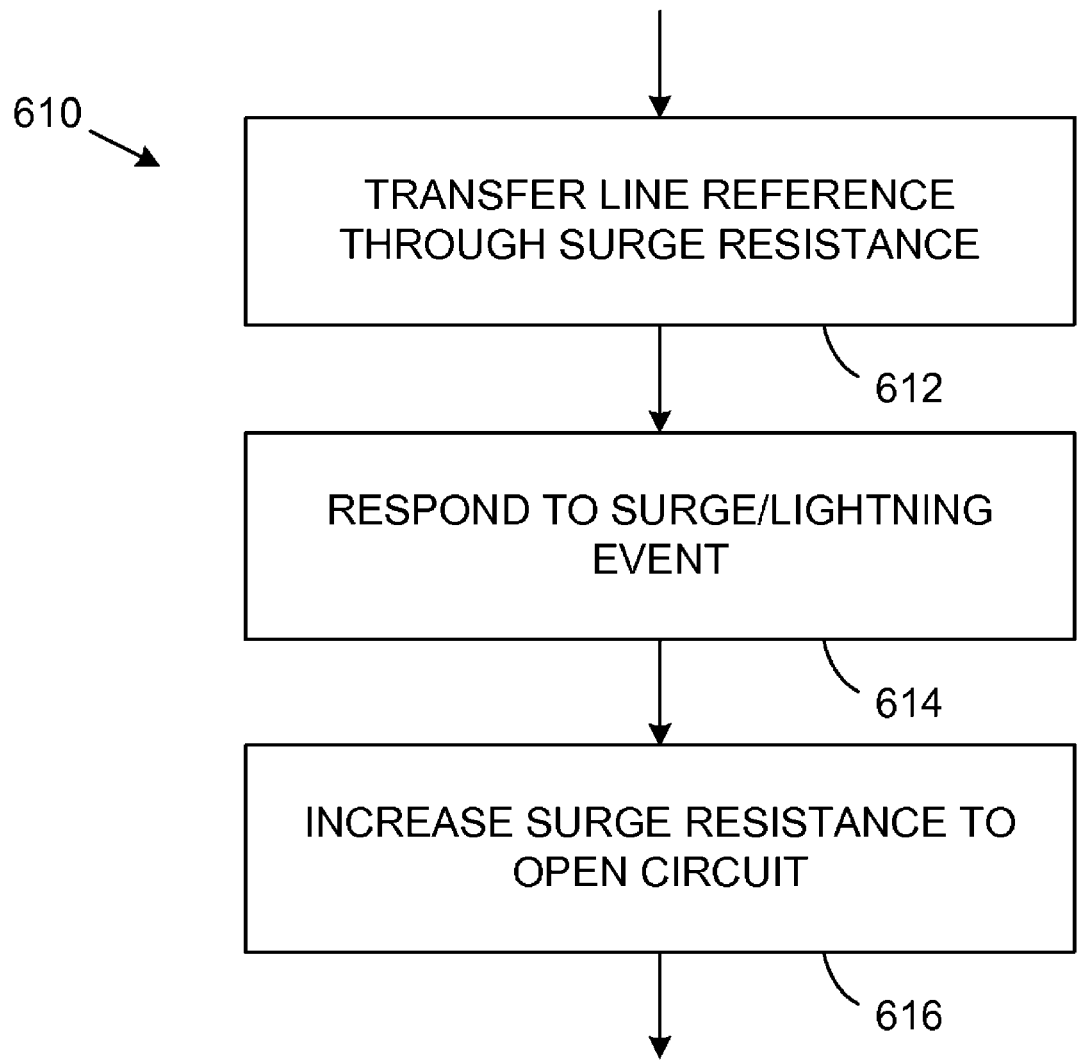

Referring to FIGS. 6A and 6B, schematic flow diagrams depict a method 600 for isolating a powered device in a network configuration that forms multiple ground domains. Operating power and data are communicated 602 to the powered device from a network line. In some embodiments, operating power and data can be communicated 602 in compliance with the Institute of Electrical and Electronics Engineers (IEEE) 802.3 Power over Ethernet standard. The network line is referenced 604 to a line reference and the powered device is referenced 606 to a device reference that can be different from the line reference, the line reference and the device reference representing different ground domains. The method 600 further comprises isolating 608 the powered device from the network line and positioning 609 an isolation boundary between distributed power and the powered device at a digital port coupled to the powered device.

In some embodiments the powered device can be isolated 608 from the network line using a capacitively-coupled interconnect that capacitively transmits a signal from the application device to the powered device whereby optical coupling between the device reference and the line reference can be omitted. In other embodiments, the powered device can be isolated 608 from the network line using an inductively-coupled interconnect that inductively transmits a signal from the application device to the powered device, also enabling optical coupling between the device reference and the line reference to be omitted.

In various embodiments, the isolation boundary can be positioned 609 between distributed power and the powered device at a digital port such as a Universal Serial Bus (USB) port, a RETMA Standard (RS)-232 port, or other suitable port.

The illustrative techniques enable operating power and data to be transferred to the powered device in absence of networking line transformers.

Referring to FIG. 6B, a method 610 for isolating the ground domains further can comprise transferring 612 the line reference through a surge resistance that forms a low impedance ground return path for electromagnetic interference (EMI) noise under normal operation. In response 614 to surge/lightning events, the surge resistance is increased 616 to open circuit, increasing impedance from the device reference to the line reference.

The IEEE 802.3 Ethernet Standard, which is incorporated herein by reference, addresses loop powering of remote Ethernet devices (802.3af). Power over Ethernet (PoE) standard and other similar standards support standardization of power delivery over Ethernet network cables to power remote client devices through the network connection. The side of link that supplies power is called Powered Supply Equipment (PSE). The side of link that receives power is the Powered device (PD). Other implementations may supply power to network attached devices over alternative networks such as, for example, Home Phoneline Networking alliance (HomePNA) local area networks and other similar networks. HomePNA uses existing telephone wires to share a single network connection within a home or building. In other examples, devices may support communication of network data signals over power lines.

In various configurations described herein, a magnetic transformer of conventional systems may be eliminated while transformer functionality is maintained. Techniques enabling replacement of the transformer may be implemented in the form of integrated circuits (ICs) or discrete components.

Figure 1A:
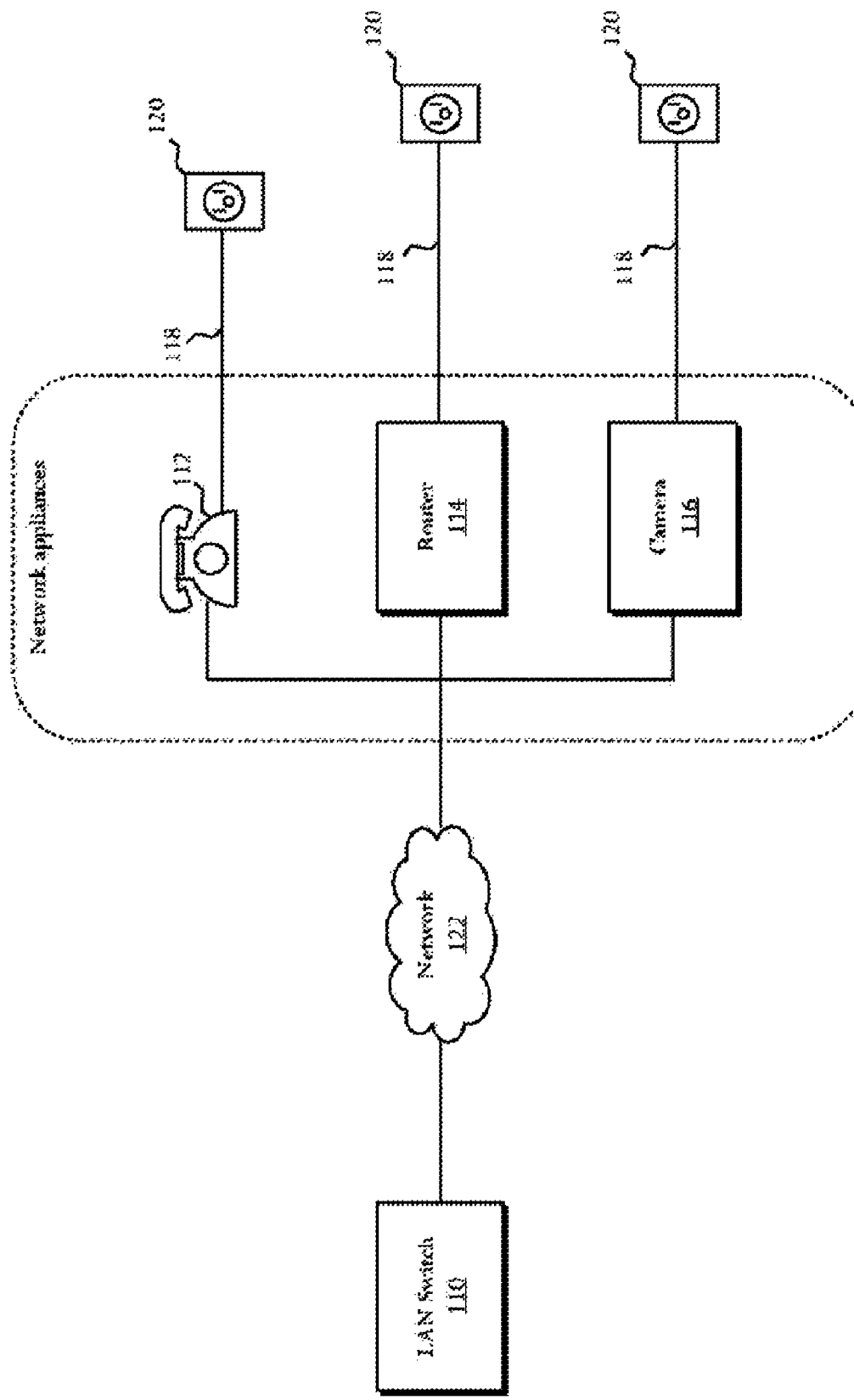
FIGS. 1A and 1B are schematic block diagrams that respectively illustrate a high level example embodiments of client devices in which power is supplied separately to network attached client devices, and a switch that is a power supply equipment (PSE)-capable power-over Ethernet (PoE) enabled LAN switch that supplies both data and power signals to the client devices.
Figure 1B:
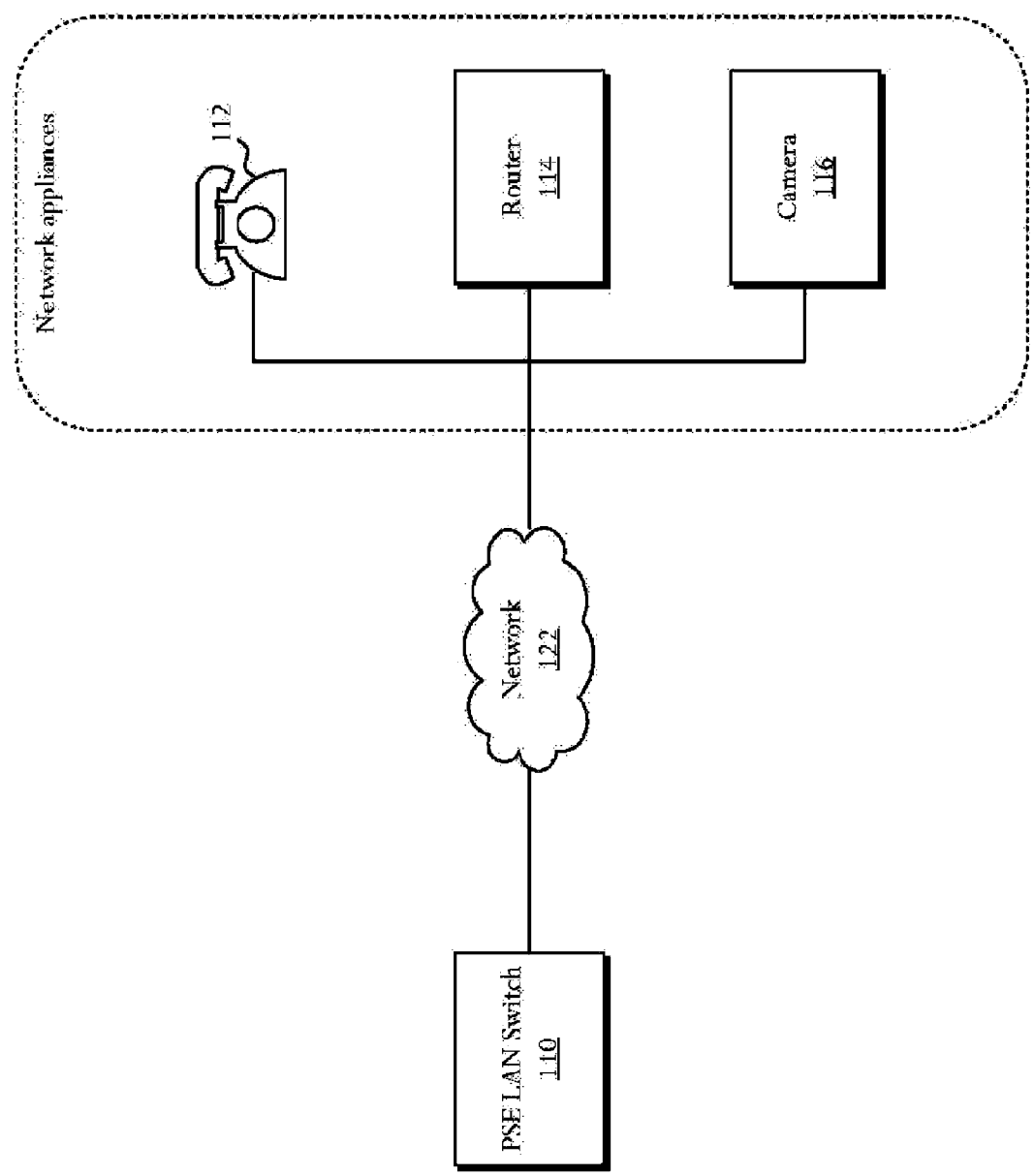

FIG. 1A is a schematic block diagram that illustrates a high level example embodiment of devices in which power is supplied separately to network attached client devices 112 through 116 that may benefit from receiving power and data via the network connection. The devices are serviced by a local area network (LAN) switch 110 for data. Individual client devices 112 through 116 have separate power connections 118 to electrical outlets 120. FIG. 1B is a schematic block diagram that depicts a high level example embodiment of devices wherein a switch 110 is a power supply equipment (PSE)-capable power-over Ethernet (PoE) enabled LAN switch that supplies both data and power signals to client devices 112 through 116. Network attached devices may include a Voice Over Internet Protocol (VoIP) telephone 112, access points, routers, gateways 114 and/or security cameras 116, as well as other known network appliances. Network supplied power enables client devices 112 through 116 to eliminate power connections 118 to electrical outlets 120 as shown in FIG. 1A. Eliminating the second connection enables the network attached device to have greater reliability when attached to the network with reduced cost and facilitated deployment.

Although the description herein may focus and describe a system and method for coupling high bandwidth data signals and power distribution between the integrated circuit and cable that uses transformer-less ICs with particular detail to the IEEE 802.3af Ethernet standard, the concepts may be applied in non-Ethernet applications and non-IEEE 802.3af applications. Also, the concepts may be applied in subsequent standards that supersede or complement the IEEE 802.3af standard.

Various embodiments of the depicted system may support solid state, and thus non-magnetic, transformer circuits operable to couple high bandwidth data signals and power signals with new mixed-signal IC technology, enabling elimination of cumbersome, real-estate intensive magnetic-based transformers.

Typical conventional communication systems use transformers to perform common mode signal blocking, 1500 volt isolation, and AC coupling of a differential signature as well as residual lightning or electromagnetic shock protection. The functions are replaced by a solid state or other similar circuits in accordance with embodiments of circuits and systems described herein whereby the circuit may couple directly to the line and provide high differential impedance and low common mode impedance. High differential impedance enables separation of the physical layer (PHY) signal from the power signal. Low common mode impedance enables elimination of a choke, allowing power to be tapped from the line. The local ground plane may float to eliminate a requirement for 1500 volt isolation. Additionally, through a combination of circuit techniques and lightning protection circuitry, voltage spike or lightning protection can be supplied to the network attached device, eliminating another function performed by transformers in traditional systems or arrangements. The disclosed technology may be applied anywhere transformers are used and is not limited to Ethernet applications.

Specific embodiments of the circuits and systems disclosed herein may be applied to various powered network attached devices or Ethernet network appliances. Such appliances include, but are not limited to VoIP telephones, routers, printers, and other similar devices.

Figure 2:
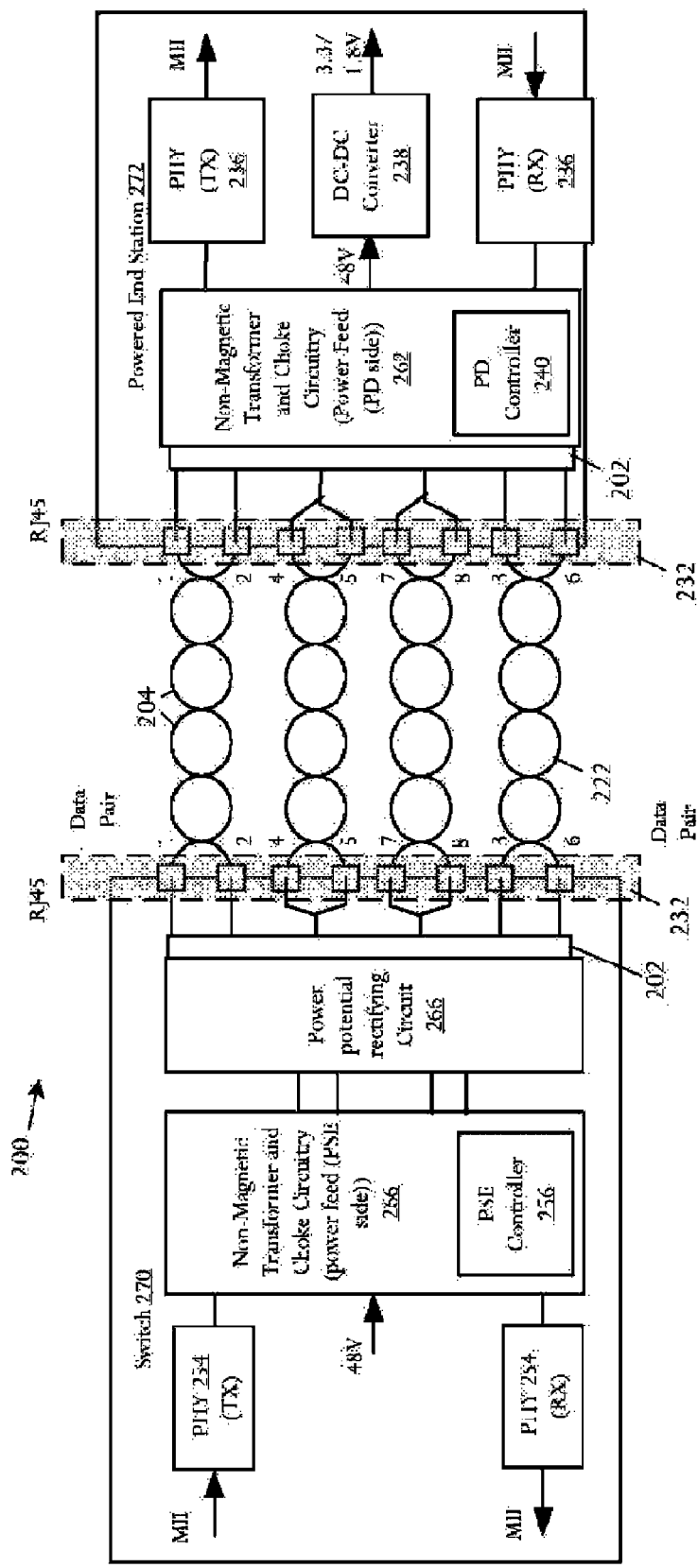
FIG. 2 is a functional block diagram illustrating a network interface including a network powered device (PD) interface and a network power supply equipment (PSE) interface, each implementing a non-magnetic transformer and choke circuitry.

Referring to FIG. 2, a functional block diagram depicts an embodiment of a network device 200 including a T-Less Connect™ solid-state transformer. The illustrative network device comprises a power potential rectifier 202 adapted to conductively couple a network connector 232 to an integrated circuit 270, 272 that rectifies and passes a power signal and data signal received from the network connector 232. The power potential rectifier 202 regulates a received power and/or data signal to ensure proper signal polarity is applied to the integrated circuit 270, 272.

The network device 200 is shown with the power sourcing switch 270 sourcing power through lines 1 and 2 of the network connector 232 in combination with lines 3 and 6.

In some embodiments, the power potential rectifier 202 is configured to couple directly to lines of the network connector 232 and regulate the power signal whereby the power potential rectifier 202 passes the data signal with substantially no degradation.

In some configuration embodiments, the network connector 232 receives multiple twisted pair conductors 204, for example twisted 22-26 gauge wire. Any one of a subset of the twisted pair conductors 204 can forward bias to deliver current and the power potential rectifier 202 can forward bias a return current path via a remaining conductor of the subset.

FIG. 2 illustrates the network interface 200 including a network powered device (PD) interface and a network power supply equipment (PSE) interface, each implementing a non-magnetic transformer and choke circuitry. A powered end station 272 is a network interface that includes a network connector 232, non-magnetic transformer and choke power feed circuitry 262, a network physical layer 236, and a power converter 238. Functionality of a magnetic transformer is replaced by circuitry 262. In the context of an Ethernet network interface, network connector 232 may be a RJ45 connector that is operable to receive multiple twisted wire pairs. Protection and conditioning circuitry may be located between network connector 232 and non-magnetic transformer and choke power feed circuitry 262 to attain surge protection in the form of voltage spike protection, lighting protection, external shock protection or other similar active functions. Conditioning circuitry may be a diode bridge or other rectifying component or device. A bridge or rectifier may couple to individual conductive lines 1-8 contained within the RJ45 connector. The circuits may be discrete components or an integrated circuit within non-magnetic transformer and choke power feed circuitry 262.

In an Ethernet application, the IEEE 802.3af standard (PoE standard) enables delivery of power over Ethernet cables to remotely power devices. The portion of the connection that receives the power may be referred to as the powered device (PD). The side of the link that supplies power is called the power sourcing equipment (PSE).

In the powered end station 272, conductors 1 through 8 of the network connector 232 couple to non-magnetic transformer and choke power feed circuitry 262. Non-magnetic transformer and choke power feed circuitry 262 may use the power feed circuit and separate the data signal portion from the power signal portion. The data signal portion may then be passed to the network physical layer (PHY) 236 while the power signal passes to power converter 238.

If the powered end station 272 is used to couple the network attached device or PD to an Ethernet network, network physical layer 236 may be operable to implement the 10 Mbps, 100 Mbps, and/or 1 Gbps physical layer functions as well as other Ethernet data protocols that may arise. The Ethernet PHY 236 may additionally couple to an Ethernet media access controller (MAC). The Ethernet PHY 236 and Ethernet MAC when coupled are operable to implement the hardware layers of an Ethernet protocol stack. The architecture may also be applied to other networks. If a power signal is not received but a traditional, non-power Ethernet signal is received the non-magnetic power feed circuitry 262 still passes the data signal to the network PHY.

The power signal separated from the network signal within non-magnetic transformer and choke power feed circuit 262 by the power feed circuit is supplied to power converter 238. Typically the power signal received does not exceed 57 volts SELV (Safety Extra Low Voltage). Typical voltage in an Ethernet application is 48-volt power. Power converter 238 may then further transform the power as a DC to DC converter to provide 1.8 to 3.3 volts, or other voltages specified by many Ethernet network attached devices.

Power-sourcing switch 270 includes a network connector 232, Ethernet or network physical layer 254, PSE controller 256, non-magnetic transformer and choke power supply circuitry 266, and possibly a multiple-port switch. Transformer functionality is supplied by non-magnetic transformer and choke power supply circuitry 266. Power-sourcing switch 270 may be used to supply power to network attached devices. Powered end station 272 and power sourcing switch 270 may be applied to an Ethernet application or other network-based applications such as, but not limited to, a vehicle-based network such as those found in an automobile, aircraft, mass transit system, or other like vehicle. Examples of specific vehicle-based networks may include a local interconnect network (LIN), a controller area network (CAN), or a flex ray network. All may be applied specifically to automotive networks for the distribution of power and data within the automobile to various monitoring circuits or for the distribution and powering of entertainment devices, such as entertainment systems, video and audio entertainment systems often found in today's vehicles. Other networks may include a high speed data network, low speed data network, time-triggered communication on CAN (TTCAN) network, a J1939-compliant network, ISO11898-compliant network, an ISO11519-2-compliant network, as well as other similar networks. Other embodiments may supply power to network attached devices over alternative networks such as but not limited to a Home-PNA local area network and other similar networks. Home-PNA uses existing telephone wires to share a single network connection within a home or building. Alternatively, embodiments may be applied where network data signals are provided over power lines.

Non-magnetic transformer and choke power feed circuitry 262 and 266 enable elimination of magnetic transformers with integrated system solutions that enable an increase in system density by replacing magnetic transformers with solid state power feed circuitry in the form of an integrated circuit or discreet component.

In some embodiments, non-magnetic transformer and choke power feed circuitry 262, network physical layer 236, power distribution management circuitry 254, and power converter 238 may be integrated into a single integrated circuit rather than discrete components at the printed circuit board level. Optional protection and power conditioning circuitry may be used to interface the integrated circuit to the network connector 232.

The Ethernet PHY may support the 10/100/1000 Mbps data rate and other future data networks such as a 10000 Mbps Ethernet network. Non-magnetic transformer and choke power feed circuitry 262 supplies line power minus the insertion loss directly to power converter 238, converting power first to a 12V supply then subsequently to lower supply levels. The circuit may be implemented in any appropriate process, for example a 0.18 or 0.13 micron process or any suitable size process.

Non-magnetic transformer and choke power feed circuitry 262 may implement functions including IEEE 802.3.af signaling and load compliance, local unregulated supply generation with surge current protection, and signal transfer between the line and integrated Ethernet PHY. Since devices are directly connected to the line, the circuit may be implemented to withstand a secondary lightning surge.

For the power over Ethernet (PoE) to be IEEE 802.3af standard compliant, the PoE may be configured to accept power with various power feeding schemes and handle power polarity reversal. A rectifier, such as a diode bridge, a switching network, or other circuit, may be implemented to ensure power signals having an appropriate polarity are delivered to nodes of the power feed circuit. Any one of the conductors 1, 4, 7 or 3 of the network RJ45 connection can forward bias to deliver current and any one of the return diodes connected can forward bias to form a return current path via one of the remaining conductors. Conductors 2, 5, 8 and 4 are connected similarly.

Non-magnetic transformer and choke power feed circuitry 262 applied to PSE may take the form of a single or multiple port switch to supply power to single or multiple devices attached to the network. Power sourcing switch 270 may be operable to receive power and data signals and combine to communicate power signals which are then distributed via an attached network. If power sourcing switch 270 is a gateway or router, a high-speed uplink couples to a network such as an Ethernet network or other network. The data signal is relayed via network PHY 254 and supplied to non-magnetic transformer and choke power feed circuitry 266. PSE switch 270 may be attached to an AC power supply or other internal or external power supply to supply a power signal to be distributed to network-attached devices that couple to power sourcing switch 270. Power controller 256 within or coupled to non-magnetic transformer and choke power feed circuitry 266 may determine, in accordance with IEEE standard 802.3af, whether a network-attached device in the case of an Ethernet network-attached device is a device operable to receive power from power supply equipment. When determined that an IEEE 802.3af compliant powered device (PD) is attached to the network, power controller 256 may supply power from power supply to non-magnetic transformer and choke power feed circuitry 266, which is sent to the downstream network-attached device through network connectors, which in the case of the Ethernet network may be an RJ45 receptacle and cable.

IEEE 802.3af Standard is to fully comply with existing non-line powered Ethernet network systems. Accordingly, PSE detects via a well-defined procedure whether the far end is PoE compliant and classify sufficient power prior to applying power to the system. Maximum allowed voltage is 57 volts for compliance with SELV (Safety Extra Low Voltage) limits.

For backward compatibility with non-powered systems, applied DC voltage begins at a very low voltage and only begins to deliver power after confirmation that a PoE device is present. In the classification phase, the PSE applies a voltage between 14.5V and 20.5V, measures the current and determines the power class of the device. In one embodiment the current signature is applied for voltages above 12.5V and below 23 Volts. Current signature range is 0-44 mA.

The normal powering mode is switched on when the PSE voltage crosses 42 Volts where power MOSFETs are enabled and the large bypass capacitor begins to charge.

A maintain power signature is applied in the PoE signature block—a minimum of 10 mA and a maximum of 23.5 kohms may be applied for the PSE to continue to feed power. The maximum current allowed is limited by the power class of the device (class 0-3 are defined). For class 0, 12.95 W is the maximum power dissipation allowed and 400ma is the maximum peak current. Once activated, the PoE will shut down if the applied voltage falls below 30V and disconnect the power MOSFETs from the line.

Power feed devices in normal power mode provide a differential open circuit at the Ethernet signal frequencies and a differential short at lower frequencies. The common mode circuit presents the capacitive and power management load at frequencies determined by the gate control circuit.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a network interface are described including several optional implementations for particular portions. Any suitable combination or permutation of the disclosed designs may be implemented.

What is claimed is:

1. A circuit comprising:
an application device comprising an Ethernet Physical layer (PHY) and a port for interfacing to a powered device;
an interface configured for coupling a network line to the powered device via the application device and communicating operating power and data to the powered device from the network line; and
an isolator coupled between the application device and the powered device isolating the application device and the interface referenced to a line reference from the powered device referenced to a device reference, the application device referenced to the line reference.

2. The circuit according to claim 1 further comprising:
the application device and the interface configured to an Institute of Electrical and Electronics Engineers (IEEE) 802.3 Power over Ethernet standard.

3. The circuit according to claim 1 further comprising:
the application device comprising an application processor and the Ethernet Physical layer (PHY) coupled between the network line and the application processor; and
the interface comprising a solid-state transformer line interface that connects the Ethernet PHY to the network line and transfers operating power and data to the powered device in absence of networking line transformers.

4. The circuit according to claim 1 further comprising:
the application device comprising an application processor and the Ethernet Physical layer (PHY) coupled between the network line to the application processor; and
a solid-state transformer line interface comprising a rectification and electromagnetic interference (EMI) protection circuit coupled to the network line, first and second power feed elements coupled to the rectification and EMI protection circuit, a powered device (PD) controller coupled between the first and second power feed elements, and a direct current-to-direct current (DC/DC) converter, the solid-state transformer line interface transferring the line reference through the DC/DC converter to a ground reference of the application device through a surge resistance, referencing the application device and the solid-state transformer line interface to a common ground.

5. The circuit according to claim 4 further comprising:
a surge resistor coupled between the interface and the application device that forms a low impedance ground return path for electromagnetic interference (EMI) noise under normal operation; and
the solid-state transformer line interface further comprising a cross-over detect circuit that responds to surge/lightning events by increasing the surge resistance to open circuit, increasing impedance from the device reference to the line reference.

6. The circuit according to claim 1 further comprising:
the isolator is a digital isolator comprising a capacitively-coupled interconnect that capacitively transmits a signal from the application device to the powered device whereby optical coupling between the device reference and the line reference can be omitted.

7. The circuit according to claim 1 further comprising:
the isolator is a digital isolator comprising an inductively-coupled interconnect that inductively transmits a signal from the application device to the powered device whereby optical coupling between the device reference and the line reference can be omitted.

8. The circuit according to claim 1 further comprising:
the isolator is a digital and power isolator comprising an interconnect and a power transformer.

9. The circuit according to claim 1 further comprising:
the interface comprising a solid-state transformer line interface that connects the Ethernet PHY to the network line and transfers operating power and data to the powered device in absence of networking line transformers.

10. The circuit according to claim 1 further comprising:
the port comprises a digital port.

11. The circuit according to claim 1 further comprising:
the port comprises a Universal Serial Bus (USB) port or a RETMA Standard (RS)-232 port.

12. The circuit according to claim 1 further comprising:
the application device comprising an application processor and the Ethernet Physical layer (PHY) coupled between the network line and the application processor; and
a Media Independent Interface (MII) coupling the Ethernet PHY to the application processor operative as a Media Access Controller (MAC) device.

13. The circuit according to claim 1 further comprising:
a Media Independent Interface (MII) coupling the Ethernet PHY to an application processor operative as a Media Access Controller (MAC) device in the powered device, the MII on an isolation boundary between distributed power and the powered device.

14. A system comprising:
a powered device;
a line connector configured for coupling to a network line;
an application device comprising an Ethernet Physical layer (PHY) and a port for interfacing to the powered device;
an interface configured for coupling the network line via the line connector to the powered device via the application device and communicating operating power and data to the powered device from the network line; and
an isolator coupled between the application device and the powered device isolating the application device and the interface referenced to a line reference from the powered device referenced to a device reference, the application device referenced to the line reference.

15. The system according to claim 14 further comprising:
the powered device comprising a device selected from a group consisting of a Voice-over-Internet-Protocol (VoIP) telephone, an Internet Protocol (IP) telephone, a wireless Local-Area-Network (LAN) Access Point, a security camera, a Web camera (webcam), an Analog Telephone Adapter (ADA), a Point-of-Sale (PoS) terminal, an Ethernet hub, a computer, and an appliance; and
the application device and the interface configured to an Institute of Electrical and Electronics Engineers (IEEE) 802.3 Power over Ethernet standard.

16. The system according to claim 14 further comprising:
a power source coupled to the network line;
the line connector comprising a Registered Jack (RJ)-45 connector; and
the network line configured as two wire pairs coupled to the RJ-45 connector.

17. The system according to claim 14 further comprising:
the application device comprising an application processor and the Ethernet Physical layer (PHY) coupled between the network line to the application processor; and
the interface comprising a solid-state transformer line interface that connects the Ethernet PHY to the network line and transfers operating power and data to the powered device in absence of networking line transformers.

18. The system according to claim 14 further comprising:
the application device comprising an application processor and the Ethernet Physical layer (PHY) coupled between the network line to the application processor; and
a solid-state transformer line interface comprising a rectification and electromagnetic interference (EMI) protection circuit coupled to the network line, first and second power feed elements coupled to the rectification and EMI protection circuit, a powered device (PD) controller coupled between the first and second power feed elements, and a direct current-to-direct current (DC/DC) converter, the solid-state transformer line interface transferring the line reference through the DC/DC converter to a ground reference of the application device through a surge resistance, referencing the application device and the solid-state transformer line interface to be referenced to a common ground.

19. The system according to claim 18 further comprising:
a transformer comprising first and second windings, the first winding coupled to the interface and the second winding coupled to the application device;
a surge resistor coupled between the interface and the application device that forms a low impedance ground return path for electromagnetic interference (EMI) noise under normal operation;
a diode coupled between the transformer second winding and the application device;
a low dropout regulator coupled between the diode and the application device; and
the solid-state transformer line interface further comprising a cross-over detect circuit that responds to surge/lightning events by increasing the surge resistance to open circuit, increasing impedance from the device reference to the line reference.

20. The system according to claim 14 further comprising:
the isolator is a digital isolator comprising a capacitively-coupled interconnect that capacitively transmits a signal from the application device to the powered device whereby optical coupling between the device reference and the line reference can be omitted.

21. The system according to claim 14 further comprising:
the isolator is a digital isolator comprising an inductively-coupled interconnect that inductively transmits a signal from the application device to the powered device whereby optical coupling between the device reference and the line reference can be omitted.

22. The system according to claim 14 further comprising:
the isolator is a digital and power isolator comprising an interconnect and a power transformer.

23. The system according to claim 14 further comprising:
the interface comprising a solid-state transformer line interface that connects the Ethernet PHY to the network line and transfers operating power and data to the powered device in absence of networking line transformers.

24. The system according to claim 14 further comprising: the port comprises a digital port.

25. The system according to claim 14 further comprising: the port comprises a Universal Serial Bus (USB) port or a RETMA Standard (RS)-232 port.

26. The system according to claim 14 further comprising: the application device comprising an application processor and the Ethernet Physical layer (PHY) coupled between the network line to the application processor; and a Media Independent Interface (MII) coupling the Ethernet PHY to the application processor operative as a Media Access Controller (MAC) device.

27. The system according to claim 14 further comprising: a Media Independent Interface (MII) coupling the Ethernet PHY to an application processor operative as a Media Access Controller (MAC) device in the powered device, the MII on an isolation boundary between distributed power and the powered device.

28. A method for isolating a powered device on a network comprising:
communicating operating power and data to a powered device from a network line;
referencing the network line to a line reference;
referencing the powered device to a device reference that can be different from the line reference;
referencing an Ethernet Physical layer (PHY) to the line reference;
isolating the powered device from the network line; and
positioning an isolation boundary between distributed power and the powered device at a digital port coupled to the powered device.

29. The method according to claim 28 further comprising: communicating operating power and data in compliance with an Institute of Electrical and Electronics Engineers (IEEE) 802.3 Power over Ethernet standard.

30. The method according to claim 28 further comprising: transferring operating power and data to the powered device in absence of networking line transformers.

31. The method according to claim 28 further comprising: transferring the line reference through a surge resistance that forms a low impedance ground return path for electromagnetic interference (EMI) noise under normal operation; and
responding to surge/lightning events by increasing the surge resistance to open circuit, increasing impedance from the device reference to the line reference.

32. The method according to claim 28 further comprising: isolating the powered device from the network line using a capacitively-coupled interconnect that capacitively transmits a signal from the application device to the powered device whereby optical coupling between the device reference and the line reference can be omitted.

33. The method according to claim 28 further comprising: isolating the powered device from the network line using an inductively-coupled interconnect that inductively transmits a signal from the application device to the powered device whereby optical coupling between the device reference and the line reference can be omitted.

34. The method according to claim 28 further comprising: positioning the isolation boundary between distributed power and the powered device at a digital port comprising a Universal Serial Bus (USB) port or a RETMA Standard (RS)-232 port.

* * * * *